United States Patent
Dong et al.

(10) Patent No.: US 12,006,271 B2
(45) Date of Patent: Jun. 11, 2024

(54) METHOD FOR SLUDGE DEWATERING USING KITCHEN WASTE TO SYNERGISTICALLY ENHANCE ANAEROBIC BIOLOGICAL ACIDIFICATION AND LOW-TEMPERATURE THERMAL HYDROLYSIS OF EXCESS SLUDGE

(71) Applicant: Tongji University, Shanghai (CN)

(72) Inventors: Bin Dong, Shanghai (CN); Sisi Chen, Shanghai (CN); Jun Gao, Shanghai (CN); Renjie Chen, Shanghai (CN); Xiangjuan Sun, Shanghai (CN); Zao Yang, Shanghai (CN); Bing Xue, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 814 days.

(21) Appl. No.: 17/153,904

(22) Filed: Jan. 21, 2021

(65) Prior Publication Data
US 2021/0323888 A1    Oct. 21, 2021

(30) Foreign Application Priority Data
Apr. 20, 2020    (CN) .......................... 202010311503.6

(51) Int. Cl.
*C05F 7/00*    (2006.01)
*C02F 9/00*    (2023.01)
(Continued)

(52) U.S. Cl.
CPC ................. *C05F 7/00* (2013.01); *C02F 9/00* (2013.01); *C02F 11/04* (2013.01); *C02F 11/127* (2013.01); *C02F 11/13* (2019.01); *C02F 2303/06* (2013.01)

(58) Field of Classification Search
CPC ....... C02F 11/04; C02F 11/121; C02F 11/127; C02F 11/13; C02F 11/18; C02F 2303/06;
(Continued)

(56) References Cited

FOREIGN PATENT DOCUMENTS

| CN | 103508643 A | 1/2014 |
| CN | 105366909 A | 3/2016 |

(Continued)

OTHER PUBLICATIONS

Disposal of Sludge from Municipal Wastewater Treatment Plant-Quality of Sludge for Co Landfilling. 2009, The Standardization Administration of the People's Republic of China.

*Primary Examiner* — Dirk R Bass
(74) *Attorney, Agent, or Firm* — Bayramoglu Law Offices LLC

(57) ABSTRACT

A method for sludge dewatering using kitchen waste to synergistically enhance a coupling of an anaerobic biological acidification and a low-temperature hydrothermal of excess sludge is disclosed. The method includes the following steps: first, uniformly mixing the excess sludge from a sewage treatment plant and the kitchen waste for an anaerobic biological acidification reaction at 36.5-37.5° C. for 2-4 days; then, concentrating the acidified mixture by centrifugation at a speed of 3000-5000 rpm for 5-10 min; performing a low-temperature thermal hydrolysis treatment on a residue obtained after removing a supernatant for 15-30 min at 100-140° C.; and after the thermal hydrolysis treatment is finished, cooling and dewatering to obtain a dewatered sludge cake and a dewatered filtrate. The new method realizes high-efficiency sludge dewatering and innocuous utilization of dewatered filtrate and sludge cake without adding chemical reagents and effectively avoids generating hardly-degradable chemical oxygen demand.

9 Claims, 1 Drawing Sheet

(51) Int. Cl.
*C02F 11/04* (2006.01)
*C02F 11/127* (2019.01)
*C02F 11/13* (2019.01)

(58) Field of Classification Search
CPC .... C02F 2303/10; C02F 2305/06; C02F 9/00; C05F 11/00; C05F 7/00; Y02A 40/20; Y02P 20/129; Y02W 10/30; Y02W 30/40
See application file for complete search history.

(56) References Cited

FOREIGN PATENT DOCUMENTS

| | | |
|---|---|---|
| CN | 106746467 A | 5/2017 |
| CN | 107285588 A | 10/2017 |
| CN | 109942161 A | 6/2019 |

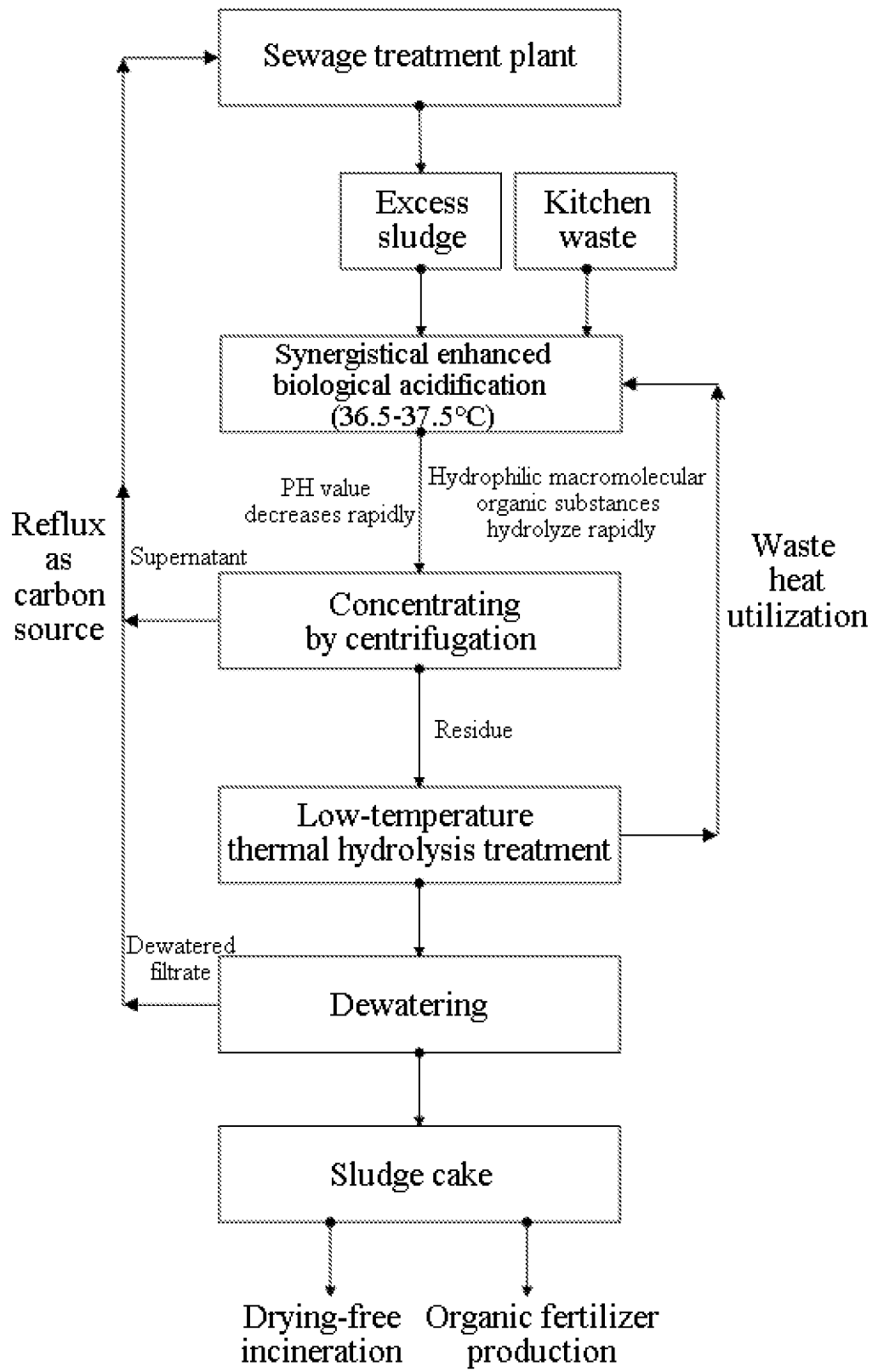

METHOD FOR SLUDGE DEWATERING USING KITCHEN WASTE TO SYNERGISTICALLY ENHANCE ANAEROBIC BIOLOGICAL ACIDIFICATION AND LOW-TEMPERATURE THERMAL HYDROLYSIS OF EXCESS SLUDGE

CROSS REFERENCE TO THE RELATED APPLICATIONS

This application is based upon and claims priority to Chinese Patent Application No. 202010311503.6, filed on Apr. 20, 2020, the entire contents of which are incorporated herein by reference.

TECHNICAL FIELD

The present invention relates to a method for sludge dewatering, and in particular, to a method for sludge dewatering using kitchen waste to synergistically enhance anaerobic biological acidification and low-temperature thermal hydrolysis of excess sludge.

BACKGROUND

Moisture content of sludge shall be strictly controlled in treating processes including sludge transportation, landfill, aerobic fermentation, incineration and others. Generally, the moisture content of sludge should be controlled at about 80% during the sludge transportation. The moisture content of sludge for sanitary landfill sludge must be lower than 60% according to the *Disposal of Sludge from Municipal Wastewater Treatment Plant-Quality of Sludge for Co-Landfilling* (GB/T23485-2009). The appropriate upper limit of moisture content of sludge for aerobic fermentation is 50-60%. The upper limit of moisture content of sludge for stable combustion in an incinerator is 60%.

However, the high moisture content (more than 95%) of the sludge from the original sewage treatment plant results in an enormous amount of sludge, thereby increasing the difficulty and cost of sludge treatment, and seriously restricting the sludge treatment efficiency. Therefore, dewatering is the necessary premise of sludge volume reduction and the first step of subsequent safe disposal and resource utilization.

Sludge are colloidal flocs with complex composition, and possesses high hydrophilicity and water holding capacity. As a result, sludge generally has extremely poor dehydration performance, and has to rely on necessary pretreatment measures to achieve effective sludge-water separation. Currently, sludge dewatering methods mainly include chemical and physical methods. The chemical method uses reactive conditioners, such as coagulant (aluminum salt, ferric salt, etc.), flocculant (cationic polyacrylamide), acid/alkali reagent (NaOH, $Ca(OH)_2$, CaO, etc.) and advanced oxidant (Fenton reagent, etc.), to change the physical and chemical properties of sludge so as to improve dewatering performance.

The chemical method typically realizes stable effects with simple operations, however, they often induce problems of high dosage of required reagents and secondary pollutants. The physical method uses ultrasonic, electric field, freeze-thaw, thermal hydrolysis and other forms to input energy to sludge so as to improve dewatering performance. Although the physical method does not cause secondary pollution, it generally has the problem of high energy consumption. For example, Chinese patent application CN201611104585.7 discloses a method for treating urban sludge based on hydrothermal carbonization. This method can strengthen the sludge dewatering performance after sludge is preheated and hydrothermal carbonized.

However, the temperature of the method is as high as 190-320° C., resulting in high energy consumption, and a large amount of refractory chemical oxygen demand (COD) generated after high-temperature reaction. It is difficult for the subsequent treatment and disposal of the filtrate and filter cake. Generally, the effect of single treatment is limited. The combination of different methods has been applied to improve the sludge dewatering performance.

Chinese patent document CN105366909A discloses a process for deep-dewatering of sludge. This process adopts thermal hydrolysis combined with chemical treatment, and the deep-dewatering of sludge is achieved after thermal hydrolysis (120-160° C., 0.5-1.2 MPa), flocculant treatment and mechanical dewatering. Additionally, the thermal hydrolysis temperature of this process is lower than 160° C., which effectively avoids the generation of hardly-degradable COD. The chemical reagents used in this process, such as flocculants, however, leads to additional pollution risk and also bring difficulties in treating the sludge cake.

Therefore, it is highly desirable to realize high-efficiency sludge dewatering and innocuous utilization of dewatered filtrate and sludge cake without adding chemical reagents and effectively avoiding the generation of refractory COD.

SUMMARY

In view of the problems in the prior art, the present invention provides a method for sludge dewatering using kitchen waste to synergistically enhance anaerobic biological acidification and low-temperature thermal hydrolysis of excess sludge. The method can realize high-efficiency sludge dewatering and innocuous utilization of dewatered filtrate and sludge cake without adding chemical reagents and effectively avoid the generation of refractory COD.

In order to achieve the above-mentioned technical objective, the technical solution of the present invention is as follows.

A method for sludge dewatering using kitchen waste to synergistically enhance anaerobic biological acidification and low-temperature thermal hydrolysis of excess sludge includes the following steps: first, uniformly mixing the excess sludge and the kitchen waste for anaerobic biological acidification at 36.5-37.5° C. for 2-4 days to obtain acidified mixture; then centrifuging the acidified mixture at a speed of 3000-5000 rpm for 5-10 min to remove the supernatant and then obtain centrifuged product; performing low-temperature thermal hydrolysis treatment on the centrifuged product for 15-30 min at 100-140° C. to obtain treated residue; and after the low-temperature thermal hydrolysis treatment is finished, cooling and dewatering the treated residue to obtain dewatered sludge cake and dewatered filtrate.

Preferably, the volatile solid mass ratio of the excess sludge and the kitchen waste is 1:1-5:1.

Preferably, the initial moisture content of the excess sludge is 90-98%, the kitchen waste is food waste collected and transported in a centralized manner, and the initial moisture content of the kitchen waste is 85-90%. Before use, the kitchen waste is ground to have a particle size of 0.1-5 mm.

Preferably, the pH value of the acidified mixture is 4-5.

Preferably, in the supernatant after centrifugation, the volatile fatty acid content is 800-1500 mg/L, and the COD degradation rate is not less than 95%. The supernatant after centrifugation is returned to a sewage treatment system of the sewage treatment plant as carbon source.

Preferably, waste heat of the thermal hydrolysis treatment is used for maintaining a required temperature for anaerobic biological acidification, and the energy recovery rate of thermal hydrolysis treatment is 80-85%.

Preferably, the solid content of the dewatered sludge cake is 35-40%.

Preferably, the dewatered sludge cake is used as an organic fertilizer after being subjected to a drying-free incineration or an aerobic fermentation.

Preferably, in the dewatered filtrate, the COD content is 8000-10000 mg/L and COD degradation rate is not less than 90%. The dewatered filtrate is returned to the sewage treatment system of the sewage treatment plant as a carbon source.

The working principle of the present invention is as follows.

The present invention first carries out a first-step modification on the excess sludge by adopting anaerobic biological acidification, and then carries out a second-step modification on the excess sludge by adopting thermal hydrolysis treatment, which enhance the sludge dewatering performance in a coupling manner. The anaerobic biological acidification can hydrolyze hydrophilic macromolecular organic substances in the excess sludge to generate volatile fatty acids and decline the pH value of the excess sludge. The kitchen waste contains a large amount of easily-degradable organic substances, and the growth and propagation of acid-producing bacteria is effective during storage and transportation processes. After the kitchen waste is mixed with excess sludge, the abundant acid-producing bacteria can promote the hydrolysis and acid-producing process of excess sludge. Meanwhile, the easily-degradable performance of the kitchen waste is beneficial to the growth of the acid-producing bacteria, so that the hydrolysis and acidification of the sludge are enhanced. After biological anaerobic acidification and then centrifugation, parts of hydrophilic macromolecular organic substances in the excess sludge are hydrolyzed and removed, thus the dewatering performance of the excess sludge is preliminarily enhanced. The residue after centrifugation is in an acid environment, which significantly enhances the destruction capacity of the thermal hydrolysis treatment on sludge cells and extracellular polymeric substances (EPS). Therefore, the dewatering performance can be effectively enhanced under the condition of relatively lower temperature, and the generation of refractory COD is avoided.

In the present invention, the main purpose of adding kitchen waste is to provide part of acid-producing bacteria, enhance the acidification process, and promote the acid production of excess sludge. The added amount of the kitchen waste is related to the cost and efficiency of the whole process. Excessively high amounts of added kitchen waste may lower the treatment rate of the sludge of the equipment; while excessively low amounts result in an insufficient enhancing effect on sludge acidification. The particle size of the kitchen waste is also related to the cost and benefit of the whole process. Excessive small particle size requires high energy consumption of grinding; while excessive large particle size affects biological hydrolysis rate, thus diminishing the promoting effect of the kitchen waste on the anaerobic biological acidification of sludge. The present invention controls the volatile solid mass ratio of the excess sludge and the kitchen waste at 1:1-5:1, and the kitchen waste is ground to have a particle size of 0.1-5 mm, which can reduce energy consumption and cost on the premise of ensuring an optimal hydrolysis rate.

In the present invention, the acidification time and the pH value after anaerobic biological acidification are very important. Too low pH value requires relatively long acidification time, resulting in increased energy consumption and cost, as well as corrosion of equipment; while insufficient acidification is unable to effectively lower the pH value, and therefore the subsequent thermal hydrolysis cannot be effectively promoted. The present invention controls the time for the anaerobic acidification for 2-4 days and the pH value after anaerobic acidification to be 4-5, so that not only the hydrophilic macromolecular organic substances in the excess sludge can be maximally hydrolyzed, but also the acidified mixture can be in a suitable acidic environment to enhance the subsequent thermal hydrolysis treatment. In this regard, the sludge dewatering performance is improved while concurrently avoiding the waste of energy and the corrosion of the equipment.

In the present invention, the acidified mixture obtained after anaerobic biological acidification needs to be centrifuged. The condition setting of centrifugation will affect the cost and efficiency of the whole process. If the centrifugation is performed at an excessively high rotating speed for an excessively long time, the moisture content of the sludge residue after the centrifugation will be extremely low, which is not conducive to the pumping and stirring in the subsequent thermal hydrolysis treatment, and meanwhile increases the cost of the whole process. If the rotating speed is too low and the time is too short, the soluble hydrophilic organic substances cannot be effectively removed to improve the dewatering performance, and meanwhile the water in the acidified mixture cannot be effectively removed, which thereby raises energy consumption and cost during subsequent thermal hydrolysis treatment. The present invention, therefore, controls the speed of centrifugation to be 3000-5000 rpm and the time to be 5-10 min, which ensures that the soluble hydrophilic organic substances can be effectively separated from the acidified mixture, so that the supernatant is rich in easily-degradable organic substances such as volatile fatty acids, and the COD degradation rate reaches 95% or more.

In the present invention, the temperature and time of the thermal hydrolysis treatment are very important. If the temperature of thermal hydrolysis treatment is too high and the time is too long, the energy consumption and cost of the treatment will be increased, and a large amount of the refractory COD will be produced; if the temperature of the thermal hydrolysis treatment is too low and the time is too short, the sludge dewatering performance cannot be effectively improved. When the pH value of the acidified mixture is 46-5, the present invention controls the temperature of the thermal hydrolysis treatment to be 100-140° C. and the time to be 15-30 min, which enables the solid content of sludge cake after dewatering to be as high as 35%-40%, so that the sludge dewatering performance is greatly improved, and the dewatered sludge cake can be subjected to the drying-free incineration.

The present invention has the following innovations.

(1) The dewatering performance of kitchen waste is better than that of excess sludge. The combination of the two substances can significantly accelerate the anaerobic biological acidification of sludge. Hydrophilic macromolecular organic substances will be hydrolyzed during the biological acidification process, and then can be effectively removed by centrifugation. Reducing the hydrophilic substances in the excess sludge will promote the dewatering performance.

The pH value of the mixture decreases significantly after anaerobic biological acidification. Under acidic conditions, the effects of the thermal hydrolysis treatment on destroying sludge cells, releasing intracellular water and decomposing extracellular hydrophilic macromolecular organic substances are significantly enhanced. Compared with the neutral pH environment, the required thermal hydrolysis temperature and energy consumption are significantly reduced when the similar enhanced dehydration effect is achieved.

(3) Compared with high-temperature thermal hydrolysis treatment (160° C. or higher), when the temperature is reduced (100-140° C.), the excess sludge will not obviously generate refractory substances during thermal hydrolysis, which can greatly improve the COD degradation rate in the dewatered filtrate, and therefore solve the problem of difficult degradation of COD in the filtrate after high-temperature thermal hydrolysis.

Compared with the prior art, the present invention has the following advantages.

(1) The prior anaerobic biological acidification generally uses fresh sludge plus inoculated sludge or specific bacteria to carry out anaerobic biological fermentation. The present invention mixes kitchen waste with hydrolysis acidification bacteria and excess sludge to carry out anaerobic biological acidification, thus there is no need to add inoculums or specific bacteria.

Different from enhanced dewatering methods such as adding acids, thermal hydrolysis (160° C. or higher), or medicament treatment (adding PAM, ferric salt, aluminum salt, etc.), the present method utilizes the kitchen waste to synergistically enhance anaerobic biological acidification and low-temperature thermal hydrolysis of excess sludge to improve dewatering performance, so that the solid content (an index for judging the dewatering performance) of the dewatered sludge cake reaches 35-40%. Moreover, no chemical reagent is required to be added in the treatment process, and the thermal hydrolysis temperature is low (100-140° C.), which effectively avoids a secondary pollution and the formation of refractory COD.

(3) The present invention achieves innocuous utilization of dewatered filtrate and sludge cake. A large amount of easily-degradable volatile fatty acids, which can be used as a carbon source is generated in the anaerobic biological acidification process. The supernatant (COD degradation rate is more than 95%) after centrifugation can be returned to a sewage treatment plant and used as a carbon source. After centrifugation, the sludge residue is subjected to thermal hydrolysis for cell breaking, intracellular organic substance releasing and extracellular macromolecular organic substances decomposing into small molecular substances, so that a large amount of organic substances, which can be used as carbon sources, are contained in the subsequent dewatered filtrate. Meanwhile, because the temperature is low (100-140° C.) and the COD degradation rate in the dewatered filtrate is high (more than 90%), the dewatered filtrate can also flow back to the sewage treatment plant for being used as a carbon source. The solid content of the dewatered sludge cake reaches 356-40%, which can be used as an organic fertilizer after being subjected to a drying-free incineration (the drying-free can save a large amount of energy consumption for the subsequent treatment of the sludge) or aerobic fermentation. In addition, the waste heat during thermal hydrolysis of the present invention can be used to maintain the required temperature for the anaerobic biological acidification, and the energy recovery rate is 80-85%.

BRIEF DESCRIPTION OF THE DRAWINGS

FIGURE is a diagram showing the process of the present invention.

DETAILED DESCRIPTION OF THE EMBODIMENTS

The features of the present invention are further described through the embodiments, but claims of the present invention are not limited thereto.

Embodiment 1

A method for sludge dewatering using kitchen waste to synergistically enhance a coupling of an anaerobic biological acidification and a low-temperature hydrothermal of excess sludge includes the following steps.

(1) The excess sludge is excess sludge from a sewage treatment plant with an initial moisture content of 90%. The kitchen waste is food waste collected and transported in a centralized manner with an initial moisture content of 85%. Before use, the kitchen waste is ground to have a particle size of 5 mm (average particle size).

(2) The excess sludge and the kitchen waste are uniformly mixed for an anaerobic biological acidification reaction at 37° C. for 2 days. A volatile solid mass ratio of the excess sludge and the kitchen waste is 1:1, and a pH value of the acidified mixture is 5.

(3) The acidified mixture is concentrated by centrifugation at a speed of 3000 rpm for 10 min, where, in a supernatant after centrifugally concentrating, a volatile fatty acid content is 1050 mg/L, and a COD degradation rate is 96%. The supernatant is returned to a sewage treatment system of the sewage treatment plant as a carbon source. A residue obtained after removing the supernatant is subjected to a low-temperature thermal hydrolysis treatment for 30 min at 100° C., then cooled and dewatered after the thermal hydrolysis treatment is finished to obtain a dewatered sludge cake and a dewatered filtrate. An energy recovery rate of the thermal hydrolysis treatment is 82%, waste heat of the thermal hydrolysis treatment is used for maintaining a required temperature for the anaerobic biological acidification. A solid content of the dewatered sludge cake is 37.2%, and the dewatered sludge cake is used as an organic fertilizer after being subjected to a drying-free incineration or an aerobic fermentation. In the dewatered filtrate, a COD content is 10000 mg/L, and a COD degradation rate is 95%. The dewatered filtrate is returned to the sewage treatment system of the sewage treatment plant as a carbon source.

Embodiment 2

A method for sludge dewatering using kitchen waste to synergistically enhance a coupling of an anaerobic biological acidification and a low-temperature hydrothermal coupling of excess sludge includes the following steps.

(1) The excess sludge is excess sludge from a sewage treatment plant with an initial moisture content of 98%. The kitchen waste is food waste collected and transported in a centralized manner with an initial moisture content of 90%. Before use, the kitchen waste is ground to have a particle size of 1 mm (average particle size).

(2) The excess sludge and the kitchen waste are uniformly mixed for an anaerobic biological acidification reaction at 36.5° C. for 4 days. A volatile solid mass ratio of the excess sludge and the kitchen waste is 5:1, and a pH value of the acidified mixture is 4.

(3) The acidified mixture is concentrated by centrifugation at a speed of 5000 rpm for 5 min, where, in a supernatant after centrifugally concentrating, a volatile fatty acid content is 850 mg/L, and a COD degradation rate is 95%. The supernatant is returned to a sewage treatment system of the sewage treatment plant as a carbon source. A residue obtained after removing the supernatant is subjected to a low-temperature thermal hydrolysis treatment for 15 min at 140° C., then cooled and dewatered after the thermal hydrolysis treatment is finished to obtain a dewatered sludge cake and a dewatered filtrate. An energy recovery rate of the thermal hydrolysis treatment is 84%, waste heat of the thermal hydrolysis treatment is used for maintaining a required temperature for the anaerobic biological acidification. A solid content of the dewatered sludge cake is 39.1%, and the dewatered sludge cake is used as an organic fertilizer after being subjected to a drying-free incineration or an aerobic fermentation. In the dewatered filtrate, a COD content is 8000 mg/L, and a COD degradation rate is 90%. The dewatered filtrate is returned to the sewage treatment system of the sewage treatment plant as a carbon source.

Embodiment 3

A method for sludge dewatering using kitchen waste to synergistically enhance a coupling of an anaerobic biological acidification and a low-temperature hydrothermal of excess sludge includes the following steps.

(1) The excess sludge is excess sludge from a sewage treatment plant with an initial moisture content of 95% The kitchen waste is food waste collected and transported in a centralized manner with an initial moisture content of 87%. Before use, the kitchen waste is ground to have a particle size of 0.1 mm (average particle size).

(2) The excess sludge and the kitchen waste are uniformly mixed for an anaerobic biological acidification reaction at 37° C. for 3 days. A volatile solid mass ratio of the excess sludge and the kitchen waste is 2:1, and a pH value of the acidified mixture is 4.

(3) The acidified mixture is concentrated by centrifugation at a speed of 4000 rpm for 10 min, where, in a supernatant after centrifugally concentrating, a volatile fatty acid content is 1250 mg/L, and a COD degradation rate is 96%. The supernatant is returned to a sewage treatment system of the sewage treatment plant as a carbon source. A residue obtained after removing the supernatant is subjected to a low-temperature thermal hydrolysis treatment for 30 min at 120° C., then cooled and dewatered after the thermal hydrolysis treatment is finished to obtain a dewatered sludge cake and a dewatered filtrate. An energy recovery rate of the thermal hydrolysis treatment is 80%, waste heat of the thermal hydrolysis treatment is used for maintaining a required temperature for the anaerobic biological acidification. A solid content of the dewatered sludge cake is 36.9%, and the dewatered sludge cake is used as an organic fertilizer after being subjected to a drying-free incineration or an aerobic fermentation. In the dewatered filtrate, a COD content is 9000 mg/L, and a COD degradation rate is 92%. The dewatered filtrate is returned to the sewage treatment system of the sewage treatment plant as a carbon source.

Comparative Example 1

(1) The excess sludge is excess sludge from a sewage treatment plant with an initial moisture content of 90%. The kitchen waste is food waste collected and transported in a centralized manner with an initial moisture content of 85%. Before use, the kitchen waste is ground to have a particle size of 5 mm (average particle size).

(2) The excess sludge and the kitchen waste are uniformly mixed for an anaerobic biological acidification reaction at 37° C. for 2 days. A volatile solid mass ratio of the excess sludge and the kitchen waste is 1:1, and a pH value of the acidified mixture is 5.

(3) The acidified mixture is concentrated by centrifugation at a speed of 3000 rpm for 10 min. Residues obtained after removing a supernatant are subjected to a low-temperature thermal hydrolysis treatment for 15 min, 30 min and 45 min at 80° C., respectively. The residues are cooled and dewatered after the thermal hydrolysis treatment is finished to obtain dewatered sludge cakes and dewatered filtrates. Solid contents of the dewatered sludge cakes are 21%, 22.5% and 23%, respectively, and COD degradation rates of the dewatered filtrates are 92%, 93% and 93%, respectively.

Comparative Example 2

(1) The excess sludge is excess sludge from a sewage treatment plant with an initial moisture content of 90%. The kitchen waste is food waste collected and transported in a centralized manner with an initial moisture content of 85%. Before use, the kitchen waste is ground to have a particle size of 5 mm (average particle size).

(2) The excess sludge and the kitchen waste are uniformly mixed for an anaerobic biological acidification reaction at 37° C. for 2 days. A volatile solid mass ratio of the excess sludge and the kitchen waste is 1:1, and a pH value of the acidified mixture is 5.

(3) The acidified mixture is concentrated by centrifugation at a speed of 3000 rpm for 10 min. Residues obtained after removing a supernatant are subjected to a low-temperature thermal hydrolysis treatment for 15 min, 30 min and 45 min at 160° C., respectively. The residues are cooled and dewatered after the thermal hydrolysis treatment is finished to obtain dewatered sludge cakes and dewatered filtrates. Solid contents of the dewatered sludge cakes are 45%, 45.2% and 45.2%, respectively, and COD degradation rates of the dewatered filtrates are 77.5%, 77.6% and 75%, respectively.

It can be understood that the above specific description of the present invention is only used to illustrate the present invention and the present invention is not limited to the technical solutions described in the embodiments of the present invention. It should be understood by those of ordinary skill in the art that modifications and equivalents may still be made to the present invention in order to achieve the same technical results; they are within the scope of the present invention as long as the use needs are met.

What is claimed is:

1. A method for sludge dewatering using kitchen waste to synergistically enhance anaerobic biological acidification and low-temperature thermal hydrolysis of excess sludge includes the following steps:
   first, uniformly mixing the excess sludge and the kitchen waste for anaerobic biological acidification at 36.5-37.5° C. for 2-4 days to obtain an acidified mixture, wherein a pH value of the acidified mixture is 4-5;
   then centrifuging the acidified mixture at a speed of 3000-5000 rpm for 5-10 min to remove a supernatant and then obtain a centrifuged product, wherein a volatile fatty acid content of the supernatant is 800-1500 mg/L, and a chemical oxygen demand (COD) degradation rate of the supernatant is not less than 95%; the supernatant after centrifugally concentrating is returned to a sewage treatment system of a sewage treatment plant as a carbon source;

performing a low-temperature thermal hydrolysis treatment on the centrifuged product for 15-30 min at 100-140° C. to obtain a treated residue;

and after the low-temperature thermal hydrolysis treatment is finished, cooling and dewatering the treated residue to obtain a dewatered sludge cake and a dewatered filtrate.

2. The method according to claim 1, wherein a volatile solid mass ratio of the excess sludge and the kitchen waste is 1:1-5:1.

3. The method according to claim 1, wherein an initial moisture content of the excess sludge is 90-98%; the kitchen waste is food waste collected and transported in a centralized manner, and an initial moisture content of the kitchen waste is 85-90%; before use, the kitchen waste is ground to have a particle size of 0.1-5 mm.

4. The method according to claim 1, wherein waste heat of the low-temperature thermal hydrolysis treatment is used for maintaining a required temperature for the anaerobic biological acidification, and an energy recovery rate of the low-temperature thermal hydrolysis treatment is 80-85%.

5. The method according to claim 1, wherein a solid content of the dewatered sludge cake is 35-40%.

6. The method according to claim 1, wherein the dewatered sludge cake is used as an organic fertilizer after being subjected to a drying-free incineration or an aerobic fermentation.

7. The method according to claim 1, wherein a COD content of the dewatered filtrate is 8000-10000 mg/L, a COD degradation rate of the dewatered filtrate is not less than 90%; the dewatered filtrate is returned to the sewage treatment system of the sewage treatment plant as a carbon source.

8. The method according to claim 2, wherein an initial moisture content of the excess sludge is 90-98%; the kitchen waste is food waste collected and transported in a centralized manner, and an initial moisture content of the kitchen waste is 85-90%; before use, the kitchen waste is ground to have a particle size of 0.1-5 mm.

9. The method according to claim 5, wherein the dewatered sludge cake is used as an organic fertilizer after being subjected to a drying-free incineration or an aerobic fermentation.

* * * * *